UNITED STATES PATENT OFFICE.

WILLIAM M. NORRIS, OF PRINCETON, NEW JERSEY, ASSIGNOR OF ONE-HALF TO HENRY BURK, OF PHILADELPHIA, PENNSYLVANIA.

PROCESS OF TAWING SKINS.

SPECIFICATION forming part of Letters Patent No. 498,214, dated May 23, 1893.

Application filed July 14, 1891. Serial No. 399,448. (No specimens.)

*To all whom it may concern:*

Be it known that I, WILLIAM M. NORRIS, of Princeton, in the county of Mercer and State of New Jersey, have invented a new and Improved Process of Tawing Skins, of which the following is a full, clear, and exact description.

My invention relates to a process for tawing skins, and has for its object to provide an effective process for tawing skins to produce especially what is known as "glazed" and "dull" kid.

The invention consists in first forming in the skin a chromium compound and then subjecting the same to the reducing action of sulphureted hydrogen or hydrogen sulphide, as will be hereinafter described and pointed out in the claims.

In carrying the invention into effect, the skins are unhaired by any of the methods now in use, that is, by lime and sulphide of arsenic, or lime and sulphide of sodium, making a sulphide of lime. By washing the skins the sulphide of arsenic, or the sulphide of sodium, whichever is used, is removed. When this is effected the lime is removed from the skin, and this is usually effected by placing the skins in a bath prepared from dog-manure, or preferably by subjecting them to the action of sulphureted hydrogen gas. The skins are then "slated," thoroughly washed and soaked for an hour or so in a two per cent. solution of common salt, after which they are ready for the tawing process. This preparatory treatment I lay no claim to, as my invention consists in the subsequent steps which are as follows:

The skins are treated with a solution prepared by adding muriatic acid to a strong hot solution of bichromate of potash, the amount of bichromate being equal to about five per cent. of the weight of the skins or hides to be treated, by which treatment a chromium compound is formed in the skins. After the skins have been thus treated for about three hours, until they have sufficiently absorbed the chromium compound, they are removed, lightly "struck out," and are then subjected to the reducing action of sulphureted hydrogen or hydrogen sulphide, as described below. Any suitable apparatus for the manufacture of sulphureted hydrogen gas is now placed within convenient proximity to the drum. Sulphide of iron and water are placed in the apparatus and sulphuric acid is added in small quantities at a time. Sulphureted hydrogen gas will at once be developed, and it is led from the apparatus by means of a rubber tube passed through water to free it from impurities into the above mentioned drum, which contains the skins. When the yellow color of the skins when they come from the first bath has been converted by the second step of the treatment to a greenish blue, the desired reduction will have been effected. When three pounds of chromic acid have been used, the sulphureted hydrogen gas which will be developed from four pounds of sulphide of iron by the action of four pounds of sulphuric acid is the amount of gas required.

After the skins have been subjected to the action of sulphureted hydrogen gas for about two hours, it will be found that all of the chromic acid has been converted into chromic oxide. The skins are now washed, "fat liquored" and finished in the usual manner.

I claim as new and desire to secure by Letters Patent—

1. The herein described process of tawing skins, which consists in first subjecting them to the action of a bath prepared from bichromate of potash, and then to the reducing action of sulphureted hydrogen or hydrogen sulphide.

2. The herein described process of tawing hides or skins, consisting in forming in the same a chromium compound, and then subjecting the same to the reducing action of hydrogen sulphide.

WILLIAM M. NORRIS.

Witnesses:
H. S. ROBINSON,
FRANCIS G. GILL.